Figure 1:
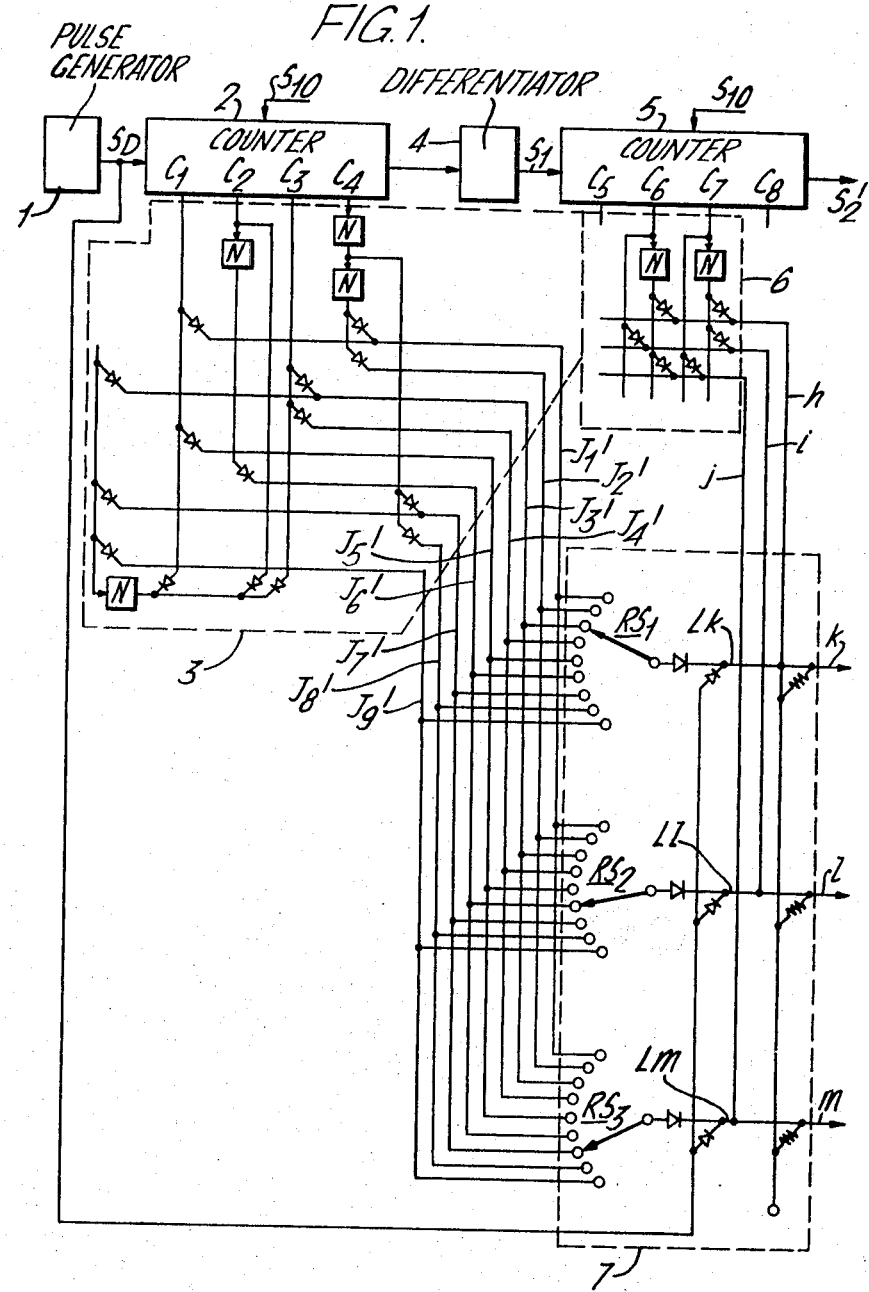
Figure 1A:
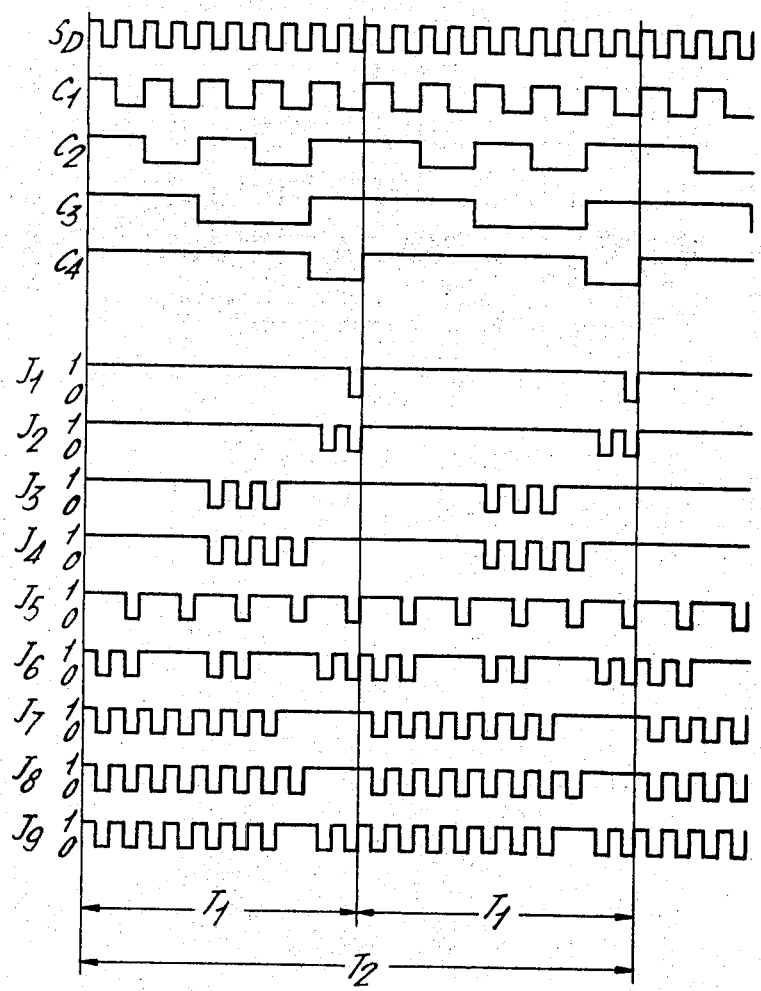

United States Patent
Konisi et al.

[15] 3,657,526
[45] Apr. 18, 1972

[54] CALCULATING SYSTEM FOR AN AUTOMATIC WEIGHING SCALE

[72] Inventors: Kenzi Konisi, Osaka; Katsumi Iwatani; Yukio Kakizono, both of Kyoto, all of Japan

[73] Assignee: Omron Tateisi Electronics Co., Kyoto, Japan

[22] Filed: May 11, 1970

[21] Appl. No.: 36,041

[30] Foreign Application Priority Data

May 15, 1969 Japan..................................44/37557
May 15, 1969 Japan..................................44/37558

[52] U.S. Cl. ..........................................235/151.33, 177/3 X
[51] Int. Cl.....................................G01g 19/413, G06f 7/39
[58] Field of Search ..................235/151.33, 61 PS; 177/3 X

[56] References Cited

UNITED STATES PATENTS

| | | |
|---|---|---|
| 3,532,865 | 10/1970 | Karp et al. ......................235/151.33 X |
| 3,557,353 | 1/1971 | Allen et al. .........................235/151.33 |
| 3,453,422 | 7/1969 | Susor..................................235/151.33 |
| 2,963,222 | 12/1960 | Allen..................................235/151.33 |

*Primary Examiner*—Malcolm A. Morrison
*Assistant Examiner*—Edward J. Wise
*Attorney*—Christensen, Sanborn & Matthews

[57] ABSTRACT

A calculating system for an automatic weighing scale wherein a rough estimate of the value of a load being weighed can be made before the scale has come to complete balance. The rough estimate of the value of the load being weighed is renewed as the scale achieves a higher and higher degree of balance.

5 Claims, 10 Drawing Figures

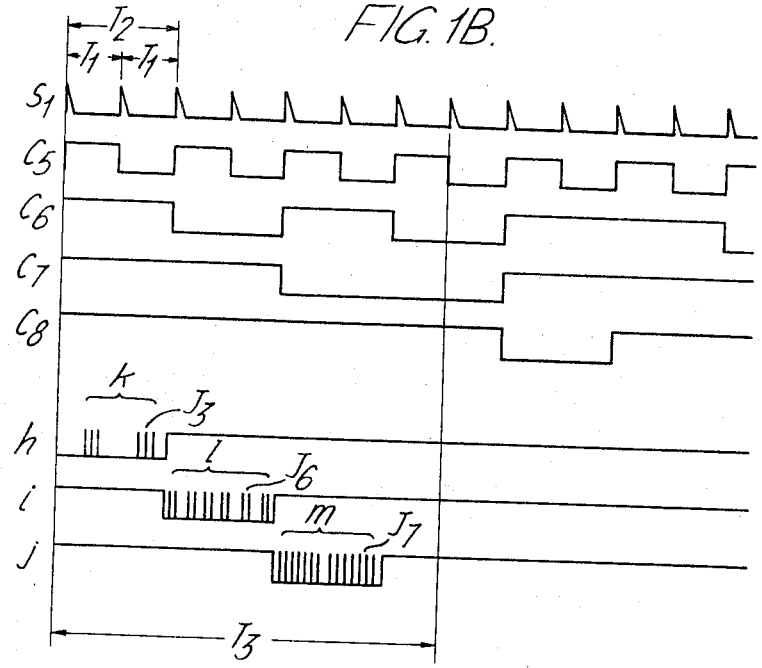
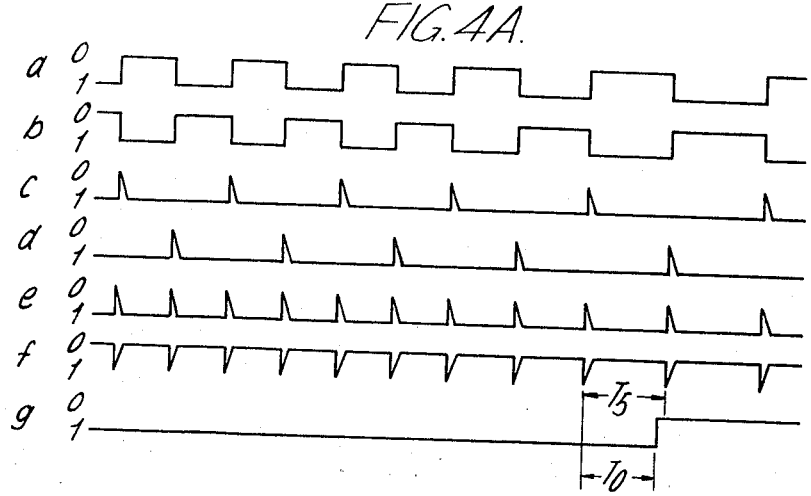

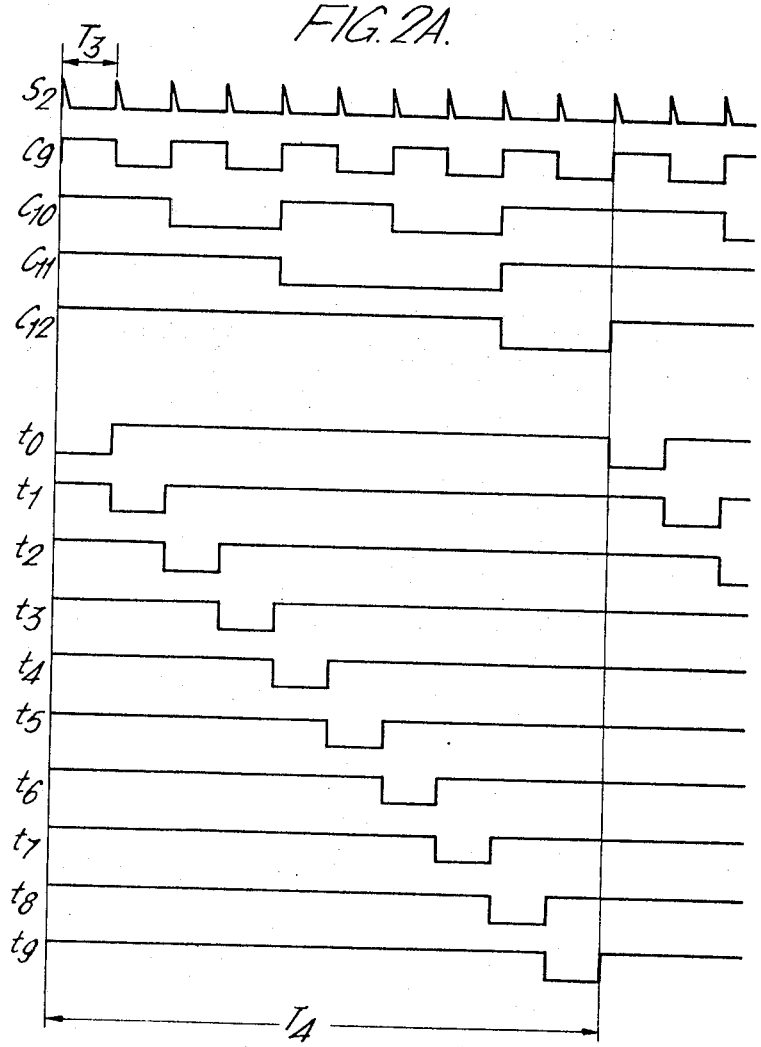

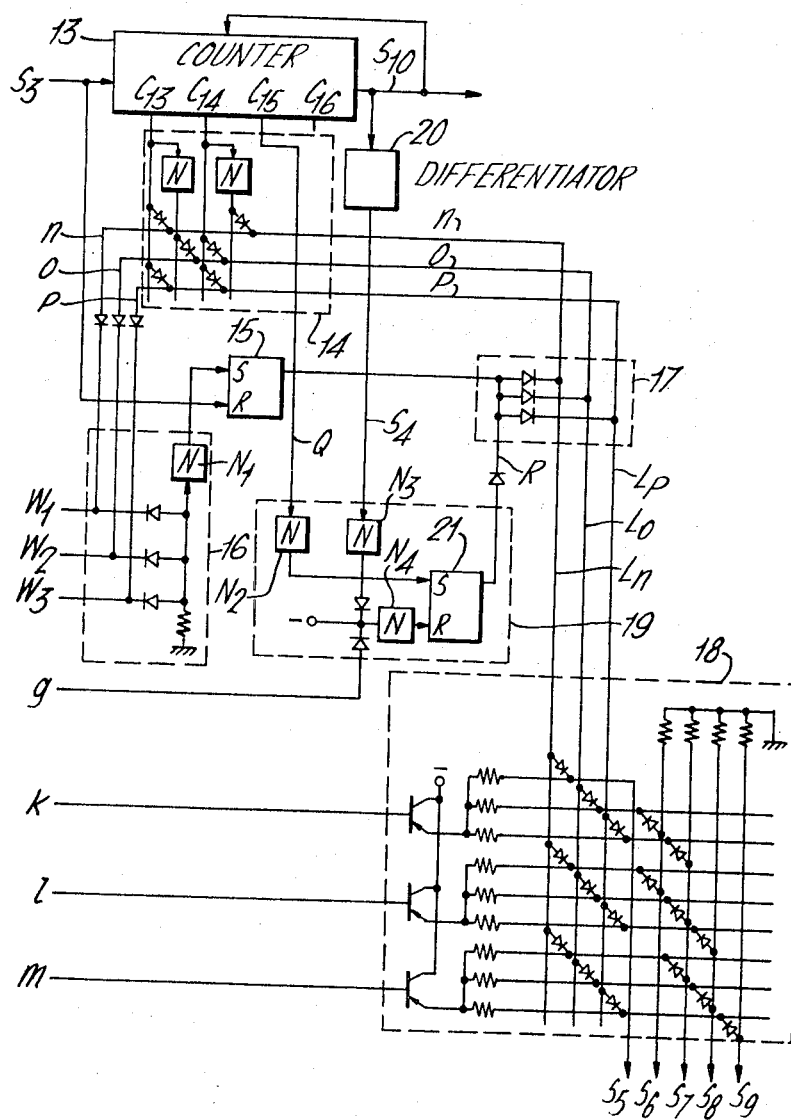

CALCULATING SYSTEM FOR AN AUTOMATIC WEIGHING SCALE

This invention relates to a system for use in an automatic weighing scale for automatically calculating the price of a weighed object by multiplying the weight of the object by a predetermined value such as the price per unit weight of the object.

In the prior art systems of this type, it has been customary to start such calculations only after the scale has come to complete balance with an object on its platter. In weighing scales, however, hunting is generally inevitable so that a more or less period of time passes before the scale has come to rest. In other words, it takes a considerably long time before the accurate result of weighing is known after an article was placed on the scale platter. This certainly is inconvenient. On the other hand, in practical weighing operations it is sometimes desired to start calculation of the value of a load being weighed when a certain degree of balance has been achieved so as to know, sooner than otherwise, a rough estimate of the value of the load. Take a butcher's shop for example. The butcher places a piece of meat measured with his eye on the scale platter. If a rough estimate of the value of the meat can be made before the scale has come to complete balance, by adding more pieces onto the scale platter or cutting off a portion of the meat thereon he can reach the required amount more quickly than if the value can be known only after a complete balance has been reached in the scale.

Accordingly, it is one object of the invention to provide a calculating system for an automatic weighing scale, which is capable of making a rough estimate of the value of a load being weighed before the scale has come to complete balance.

Another object of the invention is to provide a calculating system for an automatic weighing scale, wherein calculation for a rough estimate of the value of a load being weighed is repeated as the scale achieves a higher and higher degree of balance.

Another object of the invention is to provide a calculating system for an automatic weighing scale, wherein calculation for a rough estimate of the value of a load being weighed is repeated as the cycle of swinging of the load being weighed is lengthened until almost complete balance has been reached, whereupon the calculation is stopped.

Other objects, features and advantages of the invention will become apparent from the following detailed description of a preferred embodiment thereof with reference to the accompanying drawings, wherein:

FIGS. 1 to 5 are combined to show an electrical diagram of the whole system of one embodiment of the invention; and FIGS. 1A, 1B, 2A, 3A and 4A are waveform diagrams for explanation of the operation of the circuits as shown in FIGS. 1, 2, 3 and 4, respectively.

In the following description, a signal "1" means a negative potential and a signal "0," zero potential. When a circuit element is referred to as producing simply "a signal" or "an output," or when simply "a signal" or "an output" is referred to as being produced or appearing, that signal or output means a signal "1." The counters are caused to step by signals "0" and their count outputs are signals "1" while their "carry" outputs are signals "0." The lines or terminals and the signals thereon will sometimes be designated by the same reference symbols.

Referring now to FIG. 1, a pulse generator 1 produces a series of pulses SD, which are applied to a pulse counter 2. The counter 2 is a decade counter made up of four binary counters and having four output terminals C1, C2, C3 and C4. The outputs on these terminals are applied to a digital value signal producing circuit 3 comprising a combination of NOT elements and diodes. As the counter 1 steps forward, the circuit 3 produces a signal on lines J′1 through J′9. When combined in "AND" logic relation with the output signal SD from the pulse generator through rotary switches RS1, RS2 and RS3, the output signals on the lines J′1 through J′9 will become as shown by the waveforms J1 through J9 of FIG. 1A, respectively. These signals express the unit price, that is, the value per unit weight of the article to be weighed. Each of these signals can be produced once per cycle equal to the time T1 required for the counter 2 to complete one counting cycle. In reality, only those of the signals J1 14 J9 which are selected by the rotary switches appear on lines Lk, Ll and Lm as will be described later.

The carry output pulses from the counter 2 are applied to a differentiator 4, the output pulses S1 from which are applied to an octal counter 5 which is of a construction similar to the counter 2 and has four output terminals C5 – C8. The output signals on the terminals C6 and C7 are applied to a unit price digit selection command signal producing circuit 6 which is made up of a plurality of NOT elements and diodes and produces an output on lines $h$, $i$ and $j$ as the counter 5 steps. The waveforms of the signals S1, C5 – C8 are shown in FIG. 1B. The cycle of the signal S1 is the previously mentioned counting cycle T1 of the counter 2; and each of the signals $h$, $i$ and $j$ is produced once during one counting cycle T3 of the counter 5 so as to last for a period of time T2 equal to two counting cycles of the counter 2. Since each of the previously mentioned J1 – j1 – J9 is produced once in one counting cycle of the counter 2, it is produced twice in the period of time T2 for which the signals $h$, $i$ and $j$ last.

A unit price setting circuit 7 includes the three rotary switches RS1, RS2 and RS3, each having one movable contact and at least nine fixed contacts connected to the lines J′1 – J′9, respectively. The rotary switches RS1, RS2 and RS3 preset the first (least significant), second and third (most significant) digits, respectively, of a three-digit number expressing a unit price of the goods to be weighed. The number of rotary switches to be provided corresponds to the number of digits the unit price has. In the illustrated embodiment, it is assumed that the unit price has three digits and is set to 763 by connecting the movable contacts of the rotary switches RS3, RS2 and RS1 to the lines J″7, J′6 and J′3, respectively. Therefore, from the AND logic combination with the pulses SD supplied from the pulse generator 1, the signals J7, J6 and J3 result, which, due to the AND logic combination with the signals $j$, $i$ and $h$, appear as signals $m$, $l$ and $k$, respectively. As shown in FIG. 1B, the signals $k$, $l$ and $m$ comprise the number of pulses twice the number of pulses of the signals J3, J6 and J7, respectively.

The carry output pulses S′2 from the counter 5 are applied to a differentiator 8, which produces output pulses S2 the cycle of which is equal to the cycle T3 shown in FIG. 1B. The output pulse S2 are applied to a decade counter 9 to advance the same. The counter 9 is of a construction similar to the previously mentioned counter 3 or 5 and has four output terminals C9 – C12 connected to a timing signal producing circuit 10 comprising a plurality of NOT elements, diodes and transistors. Within one cycle T4 corresponding to 10 pulses S2 (that is, 10 cycles T3), the circuit 10 successively produces 10 timing signals $t0 - t9$ upon application of each pulse S2 to the counter 9 as shown in FIG. 2A. Therefore, the signals $k$, $l$ and $m$ are produced once in the period of time T3 of existence of each timing signal.

The timing signals $t0 - t9$ are applied to a weight signal converting circuit 11. In the illustrated embodiment it is assumed that the weight of the load being weighed is expressed by a three-digit decimal number. The scale weighs a load and the three digits of a decimal number expressing the weight of the load are applied as a binary coded signal to three binary to decimal converters M1, M2 and M3, respectively, through their respective four input terminals TM1, TM2 and TM3. The converters M1, M2 and M3 convert the binary coded signals to their respective decimal equivalents, which are applied through 10 output lines 0 – 9 to AND matrices G1, G2 and G3, respectively, to which the previously mentioned timing signals $t0 - t9$ are also applied as the other input, so that the matrices G1 – G3 produce output signals W1, W2 and W3, respectively. Suppose for example that the weight of the load as measured at a given time in the course of weighing (which will be referred to as the apparent weight of the load) is 825. Since the least significant digit of the number of 825 is "5," the converter M1 produces an output at its terminal 5, so that when this output signal coincides with the timing signal $t5$, the matrix produces the output signal W1. Similarly, with respect to the other digits of the number "825," upon coincidence of the timing signals $t2$ and $t8$ with the outputs 2 and 8 of the converters M2 and M3, respectively, the signals W2 and W3 are produced.

As will be described later, the unit price digit signals $k$, $l$ and $m$ are produced upon production of each of the timing signals $t0 - t9$ until one of the timing signals coincides with the output from each of the converters M1 – M3. To put it in more detail, the signal $k$ expressing the first (least significant) digit of the unit price is produced five times until the timing signal $t5$ is produced, so that with the unit price having been set to 763 as previously mentioned, the signal $k$ will have $3 \times 2 \times 5 = 30$ pulses until the timing signal $t5$ is produced. Similarly, with respect to the next digit, the signal $l$ will have $6 \times 2 \times 2 = 24$ pulses until the timing signal $t2$ is produced, and with respect to the third (most significant) digit, the signal $m$ will have $7 \times 2 \times 8 = 112$ pulses till the production of the timing signal $t8$. This will be referred to again later in further detail.

The carry output pulses from the counter 9 are applied to a differentiator 12, which produces an output S3. The cycle T4 of the output pulses S3 corresponds to the period of time required for production of the timing signals $t0$ through $t9$. The output pulses S3 are applied to a quaternary counter 13 of a construction similar to the previously mentioned counters and having output terminals C13 – C16. The signals at the terminals C13 and C14 are applied to an individual digit calculation command signal producing circuit 14 comprising a combination of a plurality of NOT elements and diodes and having output lines $n$, $o$ and $p$ on each of which appears a signal for commanding calculation with respect to each digit of the weight value and an output line Q on which a completion signal appears. That is, the signal $n$ is the signal to command calculation with respect to the first (least significant) digit of the weight value; the signal $o$, to command calculation with respect to the next digit; and the signal $p$, to command calculation with respect to the third CALCULATION WITH RESPECT TO THE THIRD (most significant) digit. When the calculations with respect to all the three digits have been completed, the completion signal Q is produced.

The signal S3 "0" is applied as a reset input to a flip-flop 15, whereupon it produces a set output "1." When a set input signal "0" is applied to the flip-flop, the set output thereof becomes "0." The previously mentioned signals $n$, $o$ and $p$ are applied to an individual weight digit calculation completion signal producing circuit 16, to which the weight digit signals W1, W2 and W3 are also applied so as to form an AND logic with the signals $n$, $o$ and $p$, respectively. Upon establishment of any one of the AND logic relations, the output signal "1" resulting therefrom is rendered "0" through a NOT element N1 so as to be applied as the previously mentioned set input to the flip-flop 15, whereupon the set output therefrom is rendered "0." This set output "0" prevents establishment of an AND logic condition in a weight digit selection circuit 17 to be described below, thereby completing calculation with respect to the individual weight digit as expressed by the signal W1, W2 or W3. However, the set output signal "1" from the flip-flop 15 when reset by the signal S3 is applied to the weight digit selection circuit 17 so as to form an AND logic relation to the signals $n$, $o$ and $p$ "1" Upon establishment of an AND logic relation between the two input signals, the circuit 17 produces an output on its three output lines Ln, Lo and Lp corresponding to the signals $n$, $o$ and $p$, respectively. These signals Ln, Lo and Lp are applied to an AND gate circuit 18, to which the previously mentioned unit price digit signals $k$, $l$ and $m$ are applied so as to form an AND logic relation to all of the signals Ln, Lo and Lp. The circuit 18 has five output lines S5 – S9 on which a signal appears upon establishment of an AND logic relation between the two input signals to the circuit 18. The signals S5 – S9 are frequency-divided by binary counters B1 – B5, respectively, and applied through an OR element to counters 32 – 36, respectively, which constitute a calculation circuit 31. The counter 32 is reset by the previously mentioned signal $o$ produced by the circuit 14 and the carry output from each of the counters is applied to the counter for the next higher digit.

When all of the operations for the required calculation have been finished, the counter 13 produces a carry output pulse S10, which resets all the counters in the system thereby restoring the original condition of the system.

A calculation stopping signal producing circuit 19 includes a flip-flop 21 and three NOT elements N2, N3 and N4. The signal Q "1" from the previously mentioned individual weight digit selection command signal producing circuit 14 is applied as an input to the NOT element N2, and the flip-flop 21 is set by the output "0" from the NOT element N2 to produce a set output R "0" to be applied to the individual weight digit selection circuit 17, whereupon no AND logic relation can any longer be established in the circuit 17. As a result, no signal can appear on the lines Ln, Lo and Lp and consequently on the output lines S5 – S9 of the circuit 18.

The carry output from the counter 13 is also applied to a differentiator 20, the output S4 from which is applied to the circuit 19 so as to be combined in an AND logic relation with a load unbalance signal $g$ to be described later. Upon establishment of the AND logic relation between the two input signals, the signal resulting therefrom is applied to a NOT element N3, the output "0" from which resets the flip-flop 21, whereupon the set output R "0" from the flip-flop becomes "1," so that the circuit 17 becomes ready to operate to supply the individual weight digit calculation command signals Ln, Lo and Lp to the circuit upon reception of the signals $n$, $o$ and $p$, respectively.

Figure 2:
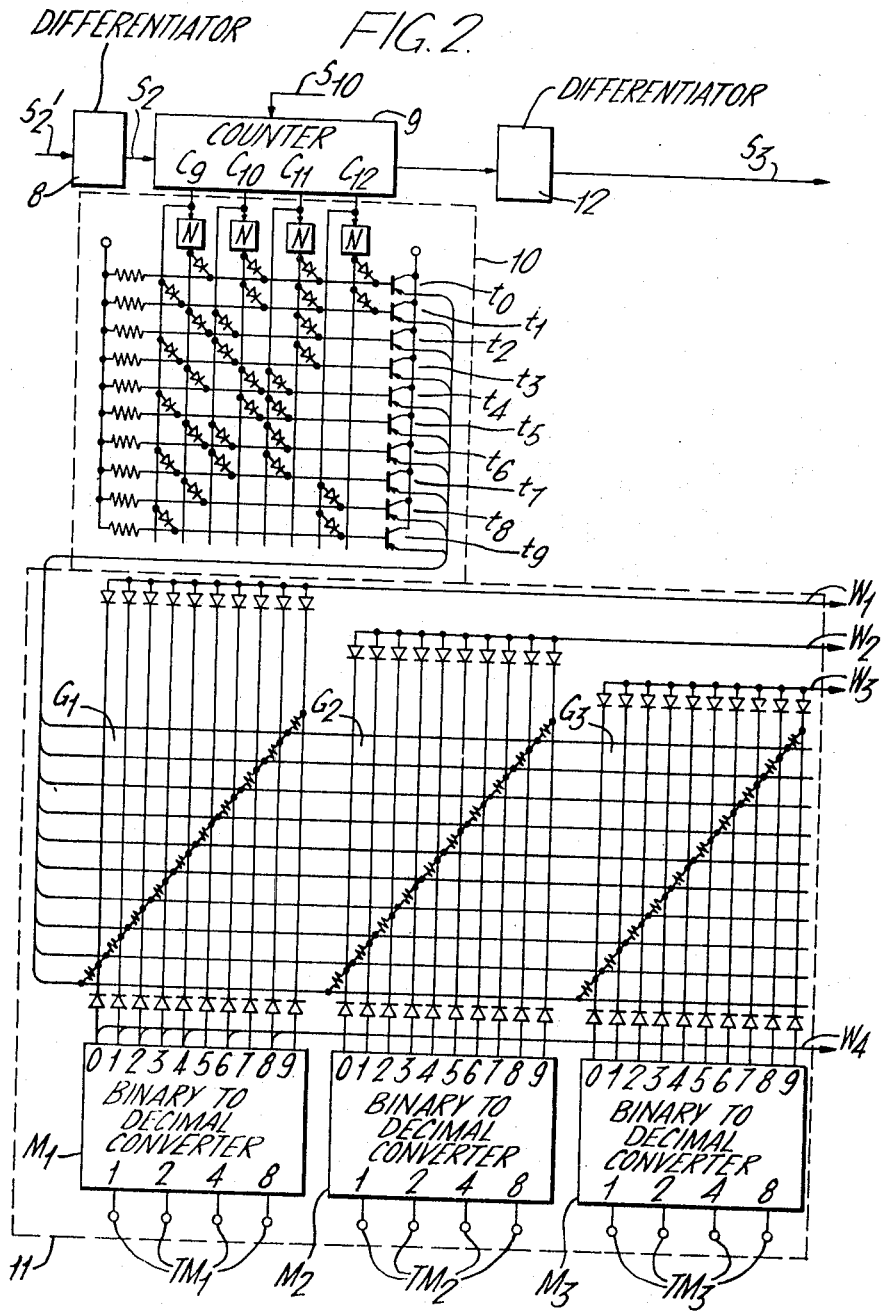
Figure 3A:
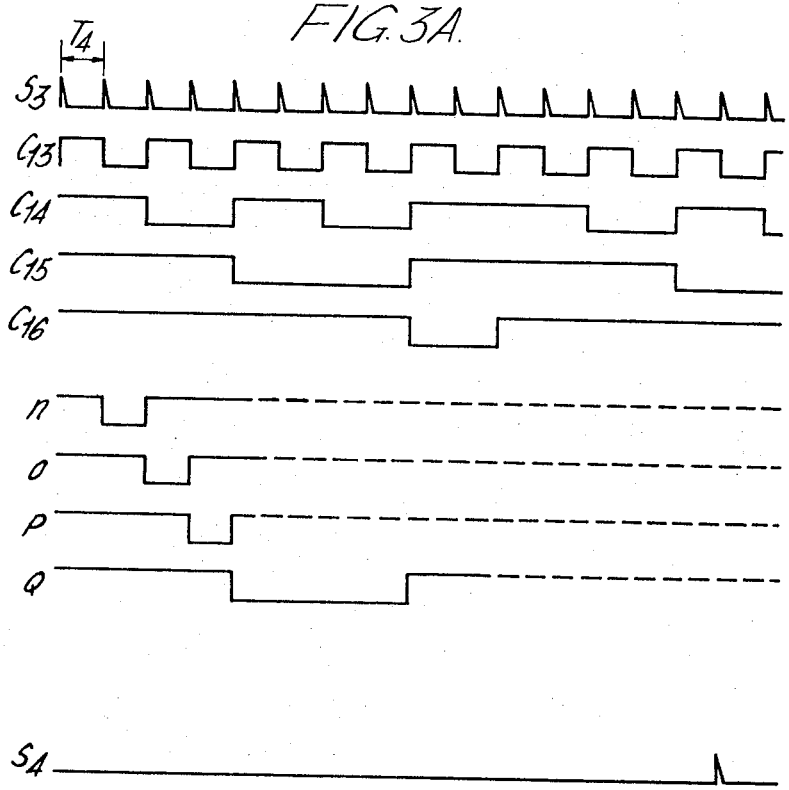
Figure 4:
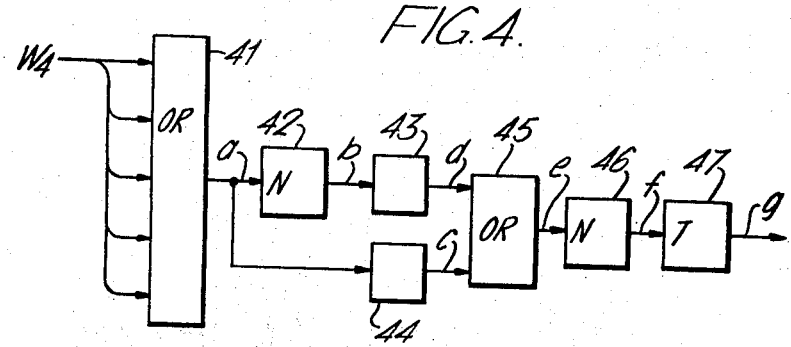

The converter M1 as shown in FIG. 2 has its even numbered outputs 0, 2, 4, 6 and 8 applied as a signal W4 to an OR element 41 in FIG. 4. The output $a$ from the OR element 41 is applied to a NOT element 42 on the one hand and to a differentiator 44 on the other. The output $b$ from the NOT element 42 is applied to a differentiator 43, the output $d$ from which is applied to an OR element 45, to which the output $c$ from the differentiator 44 is also applied. The output $e$ from the OR element 45 is applied to a NOT element 46, the output $f$ from which is applied to an on-delay element 47. Upon lapse of the delay time provided by the element 47 after application of the signal $f$ thereto, the element 47 produces an output which is used as the previously mentioned load unbalance signal $g$.

The operation of the circuit of FIG. 4 is as follows: As previously mentioned, when a load is placed on the scale platter, the platter with the load thereon swings until it has come to balance. Due to the swinging, the apparent weight of the load fluctuates about the real weight thereof, so that the output from the converter M1 shifts to and fro on the output terminals 0 – 9. This causes the signal W4 and consequently the output signal $a$ from the OR element 41 to be alternately rendered "1" and "0." As previously mentioned, the signal $a$ is applied to the OR element 45 through the NOT element 42 and the differentiator 43 on the one hand and through the differentiator 44 on the other, and the output $e$ from the OR element 45 is applied to the NOT element 46, the output $f$ from which is applied to the on-delay timer 47. The waveforms of the signals $a - f$ are shown in FIG. 4A. As will be easily seen from the previous description, the cycle T5 of the signal $f$ corresponds to the cycle of swinging of the load on the scale platter. When the cycle T5 has become longer than the delay time To provided by the timer 47, the signal $g$ "0" is produced. So long as the cycle T5 remains shorter than the delay time To, the next signal $f$ is applied to the timer 47 before lapse of the delay time To, so that the signal $g$ remains "1." Immediately after the load is placed on the scale, the swinging cycle of the load is shorter than the time To, so that the signal $g$ remains "1." When the signal $g$ has become "0,"

the swinging cycle of the load may be considered as zero or nearly zero, and at this time the apparent weight of the load may be considered as its actual weight.

The operation of the whole system as shown in FIGS. 1 – 5 will now be described. Let is be assumed again that the unit price is 763. This unit price is set by positioning the movable contacts of the three rotary switches RS1 – RS3 as shown in FIG. 1. Then, a load is placed on the scale platter, and the load swings with resulting fluctuation of its apparent weight. Suppose again that at a given time in the course of such fluctuation, the apparent weight is now 825. The converters M1 – M3 receive a coded signal corresponding to each of the digits of the number expressing the apparent weight of the load being weighed, so that an output signal is produced at the terminals 8, 2 and 5 of the converters M3, M2 and M1, respectively.

As the counter 2 steps forward, the rotary switches RS1, RS2 and RS3 produce 3, 6 and 7 pulses, respectively, during one circulation of the counter 2, and due to the successive signals $h$, $i$ and $j$ from the price digit selection command signal producing circuit 6, $3 \times 2 = 6$, $6 \times 2 = 12$ and $7 \times 2 = 14$ pulses appear on the lines $k$, $l$ and $m$, respectively. When the signals $k$, $l$ and $m$ have been produced once, the timing signal from the circuit 10 shifts from the output terminal $t0$ to $t1$. The signals $k$, $l$ and $m$ are applied to the AND gate circuit 18. At this time, since the flip-flop 15 is in the reset condition due to the carry output signal S3 from the counter 9, its set output is "1." This means that no inhibition is imposed on the individual weight digit selection circuit 17, so that the command signal $n$ for calculation with respect to the first (least significant) digit of the weight value is applied to the AND gate circuit 18. This causes the signals $k$, $l$ and $m$ to appear as the signals S5, S6 and S7, respectively. This means that the signal S5 comprises $(3 \times 2) \times 1 = 6$ pulses; the signal S6, $(6 \times 2) \times 1 = 12$ pulses; and the signal S7, $(7 \times 2) \times 1 = 14$ pulses. The operation is accomplished before the timing signal shifts from $t0$ to $t1$, and the same operation is repeated each time the timing signal shifts from $t1$ to $t2$, and $t2$ to $t3$, and so on.

When the timing signal has thus come to $t5$, that is, when the timing signal has agreed with the first digit "5" of the apparent weight value "825," and an AND logic is established between the timing signal $t5$ and the signal 5 from the converter M1, so that the signal W1 appears. Until that time, the signals S5, S6 and S7 have had $(3 \times 2) \times 5$, $(6 \times 2) \times 5$ and $(7 \times 2) \times 5$ pulses, respectively. This means that the signals S5, S6 and S7 include the numbers of pulses corresponding to the first, second and third digits of the number "$(763 \times 2) \times 5$," respectively. In other words, multiplication of each of twice the three digits 7, 6 and 3 of the unit price ($= 763$) by the first digit "5" of the apparent weight of the load being weighed has been accomplished. The signal W1 is applied to the individual weight digit calculation completion signal producing circuit 16, whereupon the flip-flop 15 is set to render its set output "0" to be applied to the individual weight digit selection circuit 17. As a result, no AND logic condition can any longer be established in the circuit 17, so that the signal Ln and consequently the signals S5 – S7 all disappear.

However, the counters 2, 5, 9 and 13 are all still kept operative and the timing signal advances farther from the terminal $t5$. When the signal has reached $t9$, the carry output pulse S3 is produced, so that the individual weight digit calculation command signal producing circuit 14 produces the signal $o$ to command calculation with respect to the second weight digit. Due to the signal S3 having reset the flip-flop 15 again, the circuit 17 permits the signal $o$ to be applied through the line Lo to the AND gate circuit 18. The calculation with respect to the second digit is conducted in a manner similar to that with respect to the first digit as described above. That is, each time the timing signal shifts from one of the terminals $t0$ – $t9$ to the next, the unit price setting circuit 7 produces the signals $k$, $l$ and $m$ to be applied to the AND gate circuit 18, and with the signal Lo being applied to the circuit 18, the signals S6, S7 and S8 are produced. When the timing signal has come to $t2$, that is, when it has come to agree with the second digit "2" of the apparent weight "825," the converter circuit 11 produces the signal W2 corresponding to the second weight digit. Until that time, the signals S6, S7 and S8 have had $(3 \times 2) \times 2$, $(6 \times 2) \times 2$ and $(7 \times 2) \times 2$ pulses, respectively, as will be easily understood from the previous description. This means that calculation of $(763 \times 2) \times 20$ has been conducted. Upon production of the signal W2, the signals S6 – S8 all disappear just as when the signal W1 was produced.

When the timing signal has reached $t9$, the counter 13 makes one forward step so that the command signal $p$ is applied to the circuit 18 for calculation with respect to the third weight digit. At this time the signals $k$, $l$ and $m$ result in the production of the signals S7, S8 and S9, respectively, and until the timing signal reaches $t8$ to produce the weight digit signal W3, the signals S7, S8 and S9 have had $(3 \times 2) \times 8$, $(6 \times 2) \times 8$ and $(7 \times 2) \times 8$ pulses. This means that calculation of $(763 \times 2) \times 800$ has been conducted. Therefore, by calculating the pulses included in each of the signals S5 – S9 by a suitable device such as will be described later, it is possible to conduct multiplication of $(763 \times 2) \times 825$.

When the timing signal has reached $t9$, the counter 13 makes one forward step so that the signal Q is produced. This signal is applied to the calculation stopping signal producing circuit 19 to set the flip-flop 21 thereby rendering its set output R "0." This signal R "0" is applied to the individual weight digit selection circuit 17, thereby preventing the production of the signals Ln, Lo and Lp to be applied to the AND gate circuit 18 any longer.

Thus, one cycle of operation has been completed. However, the result of calculation continues to be indicated until the counter 13 produces a carry pulse. If the load being weighed still swings and its swinging cycle is shorter than the cycle To, the signal $g$ remains "1" as shown in FIG. 4A, and as the counter 13 steps to produce a carry pulse, the signals S4 and $g$ establishes an AND logic in the calculation stopping signal producing circuit 19 thereby resetting the flip-flop 21. This renders the circuit 17 ready to operate for calculation with respect to a new apparent weight of the load. The operation will be repeated until the swinging cycle becomes longer than the cycle To. When the swinging cycle of the load has become longer than the cycle To (that is, when the swinging of the load has been nearly or completely stopped), the signal $g$ becomes "0" so that the flip-flop 21 of the circuit 19 remains set with its set output being maintained "0" thereby preventing further calculation.

Figure 5:
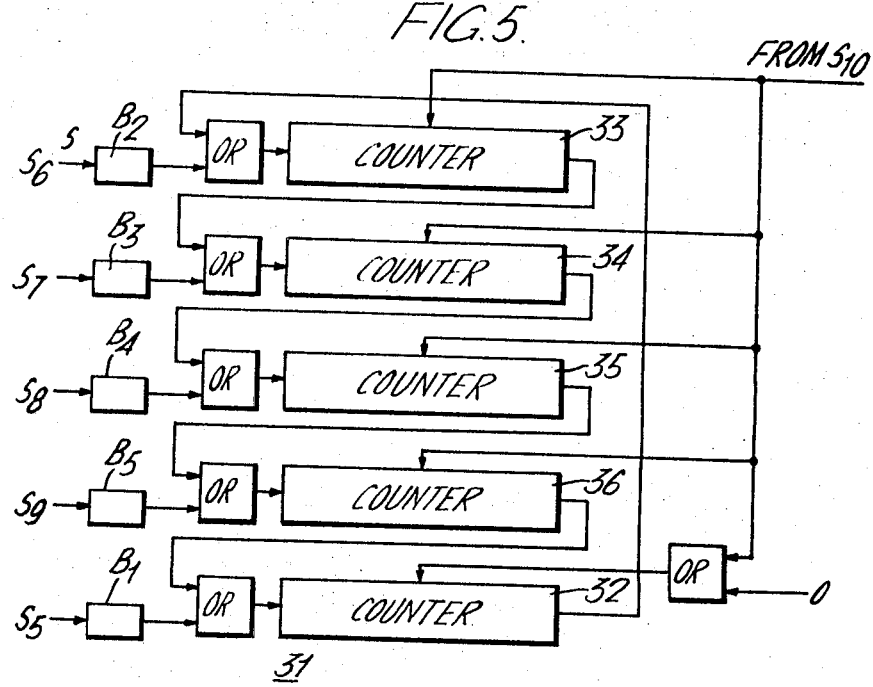

Turning to FIG. 5, a device for calculating the number of pulses of the signals S5 – S9 will now be described. As will be easily understood, six decade counters are required for multiplication of two three-digit numbers. With the arrangement of FIG. 5, however, five decade counters 32 – 36 suffice if the least significant digit of the calculated value is to be cancelled. The signal S5 expressing the least significant digit of the calculated value is divided by a binary counter B1 so as to be applied to the counter 32 through an OR element. If the signal S5 comprises more than 10 pulses, the counter 32 produces a carry output pulse to be applied to the counter 33. Since it is only while the signal $n$ exists that the signal S5 is produced, when the signal $o$ is produced, it resets the counter 32. The signals S6 and S7 produced while the signal $n$ exists are divided by binary counters B2 and B3 and then applied to the counters 33 and 34, respectively. It will be easily seen that the counts on the counters 32, 33 and 34 agree with the result of multiplication of $763 \times 5$. Similarly, while the signal $o$ exits, the signals S6, S7 and S8 are applied through binary counters B2, B3 and B4 to the counters 33 – 35 for calculation of $763 \times 20$; and while the signal $p$ exits, the signals S7, S8 and S9 are applied through binary counters B3, B4 and B5 to the counters 33 – 36 for calculation of $763 \times 800$.

The carry output pulse from the counter 36 is applied back to the counter 32. Initially, the counter 32 was used to count the pulses expressing the numerical value of the first (least significant) digit of the result of calculation and is now used to count the pulses of the sixth (most significant) digit thereof.

The use of the counter 32 in this manner has the advantage that if one of the two numbers that are to be multiplied by each other includes a decimal, it is possible to obtain the result of multiplication with the decimal having been cancelled.

What we claim is:

1. A calculating system for an automatic weighing scale which includes means for providing a weight signal corresponding to the apparent weight of a load which has been placed on said scale, comprising: first circuit means for multiplying the apparent weight represented by said weight signal by a predetermined value; second circuit means for producing a signal to stop the operation of said first circuit means when said multiplication has been completed; third circuit means for producing a load unbalance signal whenever said weight signal oscillates with a cycle shorter than a predetermined cycle; and fourth circuit means responsive to said load unbalance signal for producing a signal to remove said stop signal a predetermined period of time after the production of said stop signal so long as said unbalance signal exists, thereby causing said first circuit means to resume its operation.

2. The system of claim 1, wherein said predetermined value is the price per unit weight of said load.

3. The system of claim 1, wherein said predetermined cycle is equal to the cycle of oscillation that occurs when said load has substantially come to balance.

4. The system of claim 1, wherein said first circuit means includes means for producing a number of pulses corresponding to each of the digits of a decimal number resulting from said multiplication, and a plurality of decade counters, each for counting the number of pulses corresponding to one of said digits, the carry output pulses from each said counter being applied as an input to the counter for the next higher digit.

5. The system of claim 4, further including means connecting the output of a first one of said counters, which normally counts the number of pulses corresponding to the most significant digit of the decimal number resulting from said multiplication, to the input of a second one of said counters, which normally counts the number of pulses corresponding to the least significant digit of said decimal, and means resetting said second counter upon operation of the remaining ones of said counters so that said second counter thereafter counts the number of pulses corresponding to the most significant one of said digits.

* * * * *